(12) United States Patent
Schlesinger et al.

(10) Patent No.: US 9,571,441 B2
(45) Date of Patent: Feb. 14, 2017

(54) PEER-BASED DEVICE SET ACTIONS

(71) Applicant: MICROSOFT TECHNOLOGY LICENSING, LLC, Redmond, WA (US)

(72) Inventors: Benny Schlesinger, Ramat Hasharon (IL); Guy Kashtan, Hertzlyia (IL); Saar Yahalom, Tel Aviv (IL); Christina Summer Chen, Bellevue, WA (US); Blaise Aguera y Arcas, Seattle, WA (US)

( * ) Notice: Subject to any disclaimer, the term of this patent is extended or adjusted under 35 U.S.C. 154(b) by 0 days.

(21) Appl. No.: 14/281,468

(22) Filed: May 19, 2014

(65) Prior Publication Data

US 2015/0334071 A1 Nov. 19, 2015

(51) Int. Cl.
*H04M 1/725* (2006.01)
*H04L 12/58* (2006.01)
(Continued)

(52) U.S. Cl.
CPC ............ *H04L 51/30* (2013.01); *G06F 9/4893* (2013.01); *G06F 9/5044* (2013.01);
(Continued)

(58) Field of Classification Search
CPC ........ H04W 28/18; H04W 4/08; H04W 28/06; H04W 92/18; H04W 4/023; H04L 67/1046; H04L 67/1093; H04L 67/1051; H04L 67/1044; H04L 12/5825; H04L 12/589; H04L 65/4007; H04L 12/582; H04L 51/18; H04L 12/581; H04L 65/1059; H04L 51/046; H04L 29/08; H04L 12/281; H04L 29/12132; H04L 45/00; H04L 61/1552; H04L 67/104; H04L 45/54; G06F 15/16; G06F 9/541; G06F 9/46; G06F 2209/503; H04N 21/258
(Continued)

(56) References Cited

U.S. PATENT DOCUMENTS 7,257,610 B2 8/2007 Lai et al.
7,581,221 B2 8/2009 Lai et al.
(Continued)

OTHER PUBLICATIONS

Paterno, et al., "Ambient Intelligence for Supporting Task Continuity across Multiple Devices and Implementation Languages", In the Computer Journal, vol. 53, Issue 8, Mar. 13, 2009, 19 pages. http://giove.isti.cnr.it/attachments/publications/2009-A0-014.pdf.
(Continued)

*Primary Examiner* — Mahendra Patel
(74) *Attorney, Agent, or Firm* — Steven Spellman; Tom Wong; Micky Minhas

(57) ABSTRACT

A device set may interoperate to perform an action, such as providing a message to a user or storing photos taken by a user. Performing the action on all available devices may cause redundancy (e.g., presenting the same message to the user on each device), and depending on user selection (e.g., the user requesting to play music and specifically designating a device) may become onerous. A centralized, server-driven selection of the device to perform the action may be problematic if the server is inaccessible and/or inaccurate if not currently informed of the current state of each device. In accordance with the techniques presented herein, a requesting device broadcasts an action invitation to the device set. Each device provides a suitability report indicating its suitability to perform the action. The requesting device identifies one or more suitable devices, and sends an action request to identified devices to perform the action.

26 Claims, 9 Drawing Sheets

(51) Int. Cl.
*H04W 4/18* (2009.01)
*H04W 4/12* (2009.01)
*H04W 8/22* (2009.01)
*H04L 29/06* (2006.01)
*G06F 9/48* (2006.01)
*G06F 9/50* (2006.01)
*H04L 29/08* (2006.01)

(52) U.S. Cl.
CPC ........ *G06F 9/5066* (2013.01); *H04L 65/1069* (2013.01); *H04L 65/4046* (2013.01); *H04L 65/4076* (2013.01); *H04L 67/10* (2013.01); *H04W 4/12* (2013.01); *H04W 4/18* (2013.01); *H04W 8/22* (2013.01)

(58) Field of Classification Search
USPC ........................................ 455/412.2; 718/105
See application file for complete search history.

(56) References Cited

U.S. PATENT DOCUMENTS

| | | | |
|---|---|---|---|
| 7,890,960 B2 | 2/2011 | McKee et al. | |
| 8,255,785 B2 | 8/2012 | Baumert et al. | |
| 8,352,546 B1 | 1/2013 | Dollard | |
| 2003/0046401 A1 | 3/2003 | Abbott et al. | |
| 2006/0288362 A1* | 12/2006 | Pulton, Jr. | H04N 7/165 |
| | | | 725/34 |
| 2007/0299796 A1* | 12/2007 | Macbeth | G06Q 10/10 |
| | | | 706/16 |
| 2009/0023452 A1* | 1/2009 | Quigley | G06F 9/5044 |
| | | | 455/450 |
| 2009/0247207 A1* | 10/2009 | Lor | 455/517 |
| 2010/0058352 A1* | 3/2010 | Esfahany | G06F 9/505 |
| | | | 718/105 |
| 2011/0138064 A1* | 6/2011 | Rieger | G06F 17/30905 |
| | | | 709/228 |
| 2012/0245995 A1* | 9/2012 | Chawla | G06Q 30/02 |
| | | | 705/14.45 |
| 2012/0276879 A1* | 11/2012 | Schwartz | H04M 3/02 |
| | | | 455/414.1 |
| 2013/0122814 A1 | 5/2013 | Shen et al. | |
| 2013/0325949 A1* | 12/2013 | Virani et al. | 709/204 |
| 2014/0016507 A1* | 1/2014 | Han et al. | 370/254 |
| 2014/0095683 A1* | 4/2014 | Knowles et al. | 709/223 |
| 2014/0127991 A1* | 5/2014 | Lim et al. | 455/39 |

OTHER PUBLICATIONS

Kaowthumrong, et al., "Automated Selection of the Active Device in Interactive Multi-Device Smart Spaces", In Workshop at UbiComp, vol. 2, Sep. 29, 2002, 6 pages. http://citeseerx.ist.psu.edu/viewdoc/download?doi=10.1.1.4.8149&rep=rep1&type=pdf.

Berti, et al., "Migratory MultiModal Interfaces in MultiDevice Environments", In Proceedings of the 7th International Conference on Multimodal Interfaces, Oct. 4, 2005, 6 pages. http://www.dis.uniroma1.it/psmd05/papers/020.pdf.

Paterno, Fabio, "SMART User Interfaces in Multi-Device Ubiquitous Environments", Retrieved on: Feb. 18, 2014, pp. 11 Available at: http://hiis.isti.cnr.it/attachments/smart_cities_bologna.pdf.

"International Search Report & Written Opinion Received for PCT Application No. PCT/US2015/031268", Mailed Date: Sep. 7, 2015, 9 Pages.

"International Preliminary Report on Patentability Issued in PCT Application No. PCT/US2015/031268", Mailed Date: Aug. 2, 2016, 7 Pages.

"Second Written Opinion Issued in PCT Application No. PCT/US2015/031268", Mailed Date: Apr. 22, 2016, 6 Pages.

\* cited by examiner

PEER-BASED DEVICE SET ACTIONS

BACKGROUND

Within the field of computing, many scenarios involve a device set operated by a user, and a request for at least one device of the device set to perform an action. As a first example, a user may utilize a variety of portable and wearable devices, such as a mobile phone, a tablet, and a head-mounted display, and a messaging service may request the device set to present to the user a message, or an invitation to engage in a communication session with another user, such as an incoming voice call. As a second example, a user may request a presentation of media, such as the playing of an audio recording, on one or more of the devices. As a third example, a user may generate some data on a device, such as capturing a photo with a camera, which may be stored on one or more of the devices of the device set.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In various computing scenarios including those provided above, the performance of the action by the devices of the device set may be achieved in a variety of ways. As a first such example, an incoming message or communication session invitation for the user may be transmitted to all of the devices, and all devices receiving the message may present it to the user (e.g., a pop-up notification on each device). However, this technique may cause a redundant presentation to the user on a variety of devices, which may present an irritation to the user. Additionally, in some scenarios, the presentation of a message may be inappropriate (e.g., an audio-capable device presenting an audio alert when the user is present at a meeting), inapplicable (e.g., a message referring to a picture, presented by a device that is incapable of displaying pictures, such as an earpiece), and/or dangerous (e.g., a mobile phone presenting a message to a user who is operating a vehicle).

As a second such example, the user may interact with various devices, and may indicate a particular device on which respective actions are to be performed. For example, a user may request not only the presentation of media such as music, but may select a desired device to render the media, such as submitting a request to play music specifically through a headset, or specifically through the speaker of a tablet device. However, reliance on explicit user selection of the device(s) on which the action is to be performed may become onerous for the user, particularly where such actions are frequent.

As a third such example, in a centralized message distribution model, a server that is informed of the status of each device may evaluate the options for performing an action, may select a particular device from the device set, and may command the device to perform the action. However, such centralization depends on the server having up-to-date information about the status of every device on which the action may be performed. Such notification may be inefficient (e.g., providing frequent status updates from devices to the server, even where no such actions are requested to be performed) and/or inaccurate (e.g., device status may change more rapidly than the server may be notified, and a device may be selected by the server based on outdated information). Moreover, if the server is inaccessible (e.g., when the server is typically accessed over the internet, but is temporarily inaccessible to a personal area devices), the device set becomes unable to perform any such actions.

Presented herein are techniques for enabling the devices of a device set to perform an action. In accordance with such techniques, upon receiving, from a requesting device, an action invitation broadcast to the device set and specifying an action to be performed, send to the requesting device a suitability report indicating a suitability of the first device for performing the action; and upon receiving, from the requesting device and responsive to the suitability report, an action request to perform the action, perform the action on behalf of the requesting device. The techniques may further include, upon receiving, from a local application, a request to perform a second action, broadcasting, to the device set, an action invitation specifying the second action; and upon receiving, from at least one responding device of the device set, a suitability report indicating the suitability of the responding device to perform the second action, evaluating the respective suitability reports of the respective responding devices to identify a selected device, and sending to the selected device a second action request to perform the action on behalf of the first device. In this manner, the devices of the device set may interoperate to achieve the performance of the action according to the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
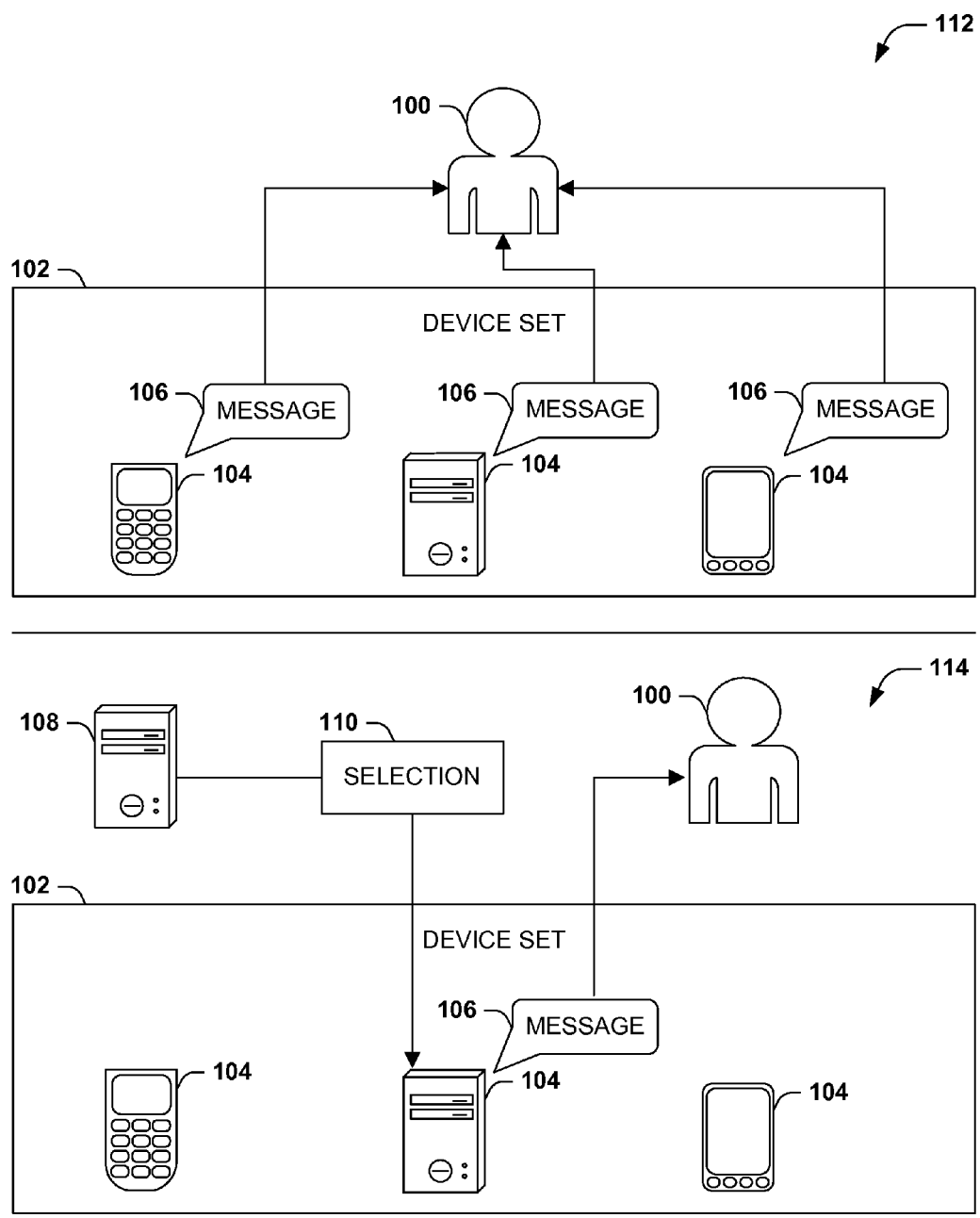
FIG. 1 is an illustration of various scenarios featuring a presentation of a message to a user of a device set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of exemplary scenarios for causing a device set 102 to perform an action on behalf of a user 100. In these scenarios, the action comprises the presentation of a message 106, such as a short message service (SMS) text message; a multimedia messaging service (MMS) picture message; a media recording, such as a voicemail message or a video; an email message; or a chat message through a realtime or near-realtime chat service. The device set 102 may comprise a set of various devices 104 that the user 100 frequently utilizes in a variety of contexts, such as a mobile phone; a workstation; and a palmtop or tablet form factor device. Though not depicted, the device set 102 may also include other devices 104 utilized by the user 100, such as a portable media player; a home media system; a portable or stationary game console; a wearable device, such as a wristwatch, earpiece, or eyewear; a navigation device, such as a global positioning system (GPS) receiver; and/or an appliance, such as a vehicle.

In a first exemplary scenario 112, each of the devices 104 of the device set 102 receives the message 106, and attempts to present the message 106 to the user 100. For example, a text message may be delivered via the simple message service to each device 104, and each device 104 may present the message 106 to the user 100. While this broadcasting of the message 106 from multiple devices 104 may ensure the receipt of the message by the user 100, the redundant presentation of the message 106 by a multitude of devices 104 may irritate the user 100. For example, the user 100 may frequently utilize the mobile phone and the workstation, and may receive the message 106 promptly from both devices 104, but may only occasionally use the tablet form factor device 104, and may receive a third copy of the message 106 via the tablet device 104 several days later. The irritation of the redundant presentation may increase proportionally with the number of devices 106 in the device set 102. As an example, a set of telephones may be provided within a building, and an incoming call causes all of the telephones to ring, even if the call is intended for a user 100 who is located near a particular telephone, and even if the user 100 is not even present in the building.

In a second exemplary scenario 114, a server 108 may continuously or periodically track the status of the devices 104 of the device set 102. Upon receiving a message 106 to be sent to the user 100, the server 108 may perform a selection 110 of a particular device 104 based on the status of each device 104, and may send the message 106 to the selected device 104 for presentation to the user 100. While this second exemplary scenario 114 may reduce the redundant presentation of the message 106 to the user 100, this architecture may exhibit significant inefficiency. As a first example, the devices 104 may have to keep the server 108 frequently informed of the status, even if messages 106 are infrequent, because the server 108 is unable to perform a selection 110 without comparatively current information about the status of each device 104. However, such informing of the server 108 may reduce the available power of each device 104. Conversely, if the devices 104 do not keep the server 108 currently informed of the status of each device 104, then the server 108 may perform an undesirable selection 110 of a device 104 upon receiving the message 106; e.g., the server 108 may make a selection 110 in view of out-of-date information, and may miss opportunities to have the message 106 presented by a device 104 that is currently in communication with the user 100.

Other exemplary scenarios may be utilized to enable the device set 102 to perform the action. For example, the user 100 may explicitly specify which device 104 is to be used to perform a particular type of action. For example, the user 100 may explicitly request the execution of an application on a particular device 104 when intending to receive particular types of messages on the device 104, such as email messages. The device set 102 may, accordingly, present the messages 106 to the user 100 only through the selected device 104. However, a dependency on explicit user selection may rapidly become onerous (e.g., if the device set 102 frequently performs actions, and/or if the user 100 becomes tired of frequently designating devices 104 for particular actions). Additionally, in some scenarios, the user 100 may forget to select a particular device 104 (e.g., forgetting to place a mobile phone in an airplane or privacy mode, thus causing the mobile phone to rung while the user 100 is in an inappropriate situation, such as attending a meeting). Some scenarios may also be incompatible with the user selection; e.g., the user 100 may designate that an audio-only earpiece devices is the primary interface for the user 100, but the earpiece device may be unable to render a particular image for the user 100 through a visual, multimedia-based message (e.g., an MMS text message). Additionally, in some scenarios, it may be dangerous to present the message 106 to the user 100, e.g., enticing the user 100 to view a text message presented on a display of a device 104 while the user 100 is operating a vehicle. These and other disadvantages may arise in some techniques for presenting messages 106 to the user 100 through a device set 102.

B. Presented Techniques

Figure 2:
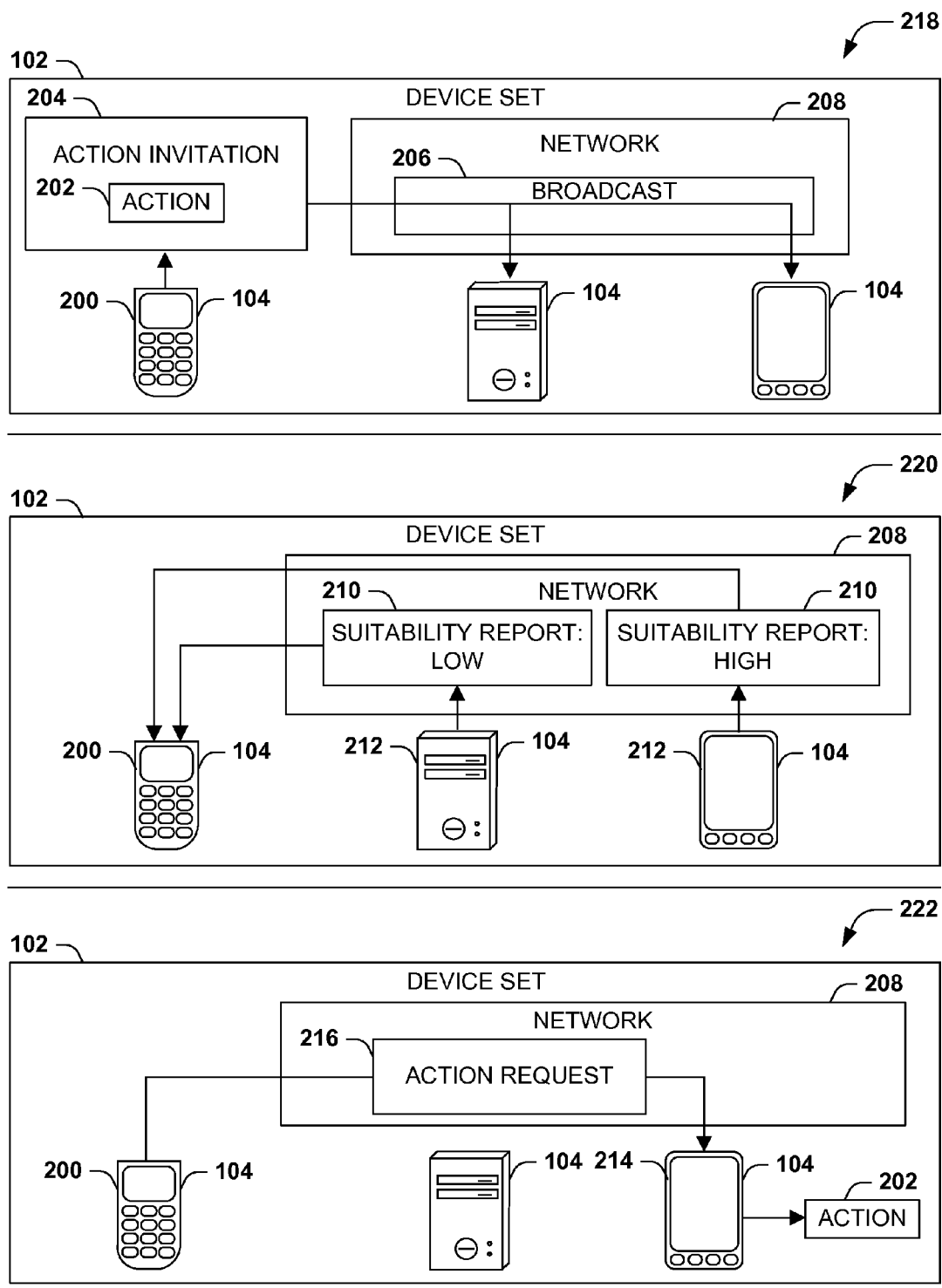
FIG. 2 is an illustration of an exemplary scenario featuring a device set performing an action in accordance with the techniques presented herein.

FIG. 2 presents an illustration of an exemplary scenario featuring a device set 102 of devices 104 that interoperate to achieve the completion of an action 202 in accordance with the techniques presented herein.

In this exemplary scenario, at a first time 218, a first device 104 of the device set, such as a mobile phone, initiates a request to have the device set 102 perform an action 202. The request to perform the action 202 may be initiated by the requesting device 200, and/or may be received by the requesting device 200 from an outside source (e.g., an incoming call). The requesting device 200 generates an action invitation 204 specifying the action 202, and broadcasts 206 the action invitation 204 to the other devices 104 of the device set 102. For example, the other devices 104 of the device set 102 may be accessible over a network 208, such as a WiFi network, a wired local area network (LAN), a cellular communication network, a wide-area network (WAN) such as the internet, and/or a personal area network (PAN) such as a Bluetooth device mesh. Alternatively, the other devices 104 may be accessible to the requesting device 104 over a broadcast-based medium, such as a radio broadcast that is receivable by any device 104 with a receiver, or a light transmission, such as light in the infrared portion of the electromagnetic spectrum, that encodes information specifying the action invitation 204 and the action 202.

At a second time 220, each device 104 of the device set 102 that has received the action invitation 204 may evaluate its suitability for performing the action 202. For example, a device 104 may identify the parameters of the action 202, and may compare such parameters with the resources and capabilities of the device 104 (e.g., computational capacity, volatile and/or nonvolatile memory, network bandwidth, and input/output capabilities); the appropriateness of the device 104 for performing the requested action 202; and the accessibility of the user 102 to the device 104. The respective other device 104 responds to the action invitation 204 by providing to the requesting device 200 a sustainability report 210 that indicates the suitability of the responding device 212 for performing the action 202. For example, in handling an incoming call, a workstation device 104 may indicate low suitability, e.g., reflecting a lower-quality microphone and speakers, while a portable device 212 such as a tablet may indicate high suitability, e.g., reflecting a microphone and speakers that are well-suited for voice communication sessions. The suitability reports 210 may be returned to the requesting device 200 using the same communication medium as used to provide the action invitation 204 to the devices 104 (e.g., using the same network 208), and/or using a different communication medium.

At a third time 222, the requesting device 200 may identify and select a responding device 212 having the highest suitability report 210 of the responding devices 214 in the device set 102. The requesting device 200 may therefore transmit to the selected device 214 an action request 216 that requests the selected device 214 to perform the action 202. The action request 216 may be transmitted over the same network 208 as the earlier communication, or may be transmitted over a different communication medium. Upon receiving the action request 216, the selected device 214 performs the action 202 on behalf of the requesting device 200 (e.g., accepting an incoming call and attempting to initiate a communication session between a caller and the user 100). In this manner, the devices 104 of the device set 102 interoperate to achieve the performance of the action 202 by an appropriate device in accordance with the techniques presented herein, while reducing or avoiding the various costs and/or disadvantages of other such techniques, including those provided in the exemplary scenario 100 of FIG. 1.

C. Technical Effects

The techniques presented herein may provide a variety of technical advantages with respect to other techniques for enabling a device set 102 to perform an action 202.

As a first such example, a device set 102 configured as provided herein may reduce the redundant execution for the action 202 by a plurality of devices 104. For example, rather than presenting the same message 106 to the user 100 on a variety of devices 104, and/or rather than causing every device 104 to notify the user 100 of a particular event (e.g., an incoming call causing every telephone in a building to ring), the presented techniques enable a contextually sensitive performance of the action 202. Such performance may reduce the inefficiency and potential irritation of redundantly performed actions 202.

As a second such example, a device set 102 configured as provided herein may reduce or avoid the involvement of a user 100 in specifying which device 104 is to perform which action 202. The capability of performing such selection automatically may provide a comparatively low-maintenance and automated device selection.

As a third such example, a device set 102 configured as provided herein may reduce reliance on a centralized server 108, which may become inaccessible (e.g., due to a network outage or a failure of the server 108). The avoidance of a server 108 may reduce the costs (such as subscription fees) and equipment involved in server-mediated scenarios. Additionally, the resolution of the selection among the devices 104 of a user 100 may promote the privacy of the user 100 by retaining information about the performance of various actions 202 within the device set 102 (e.g., within the personal area network of the user 100) rather than transmitting such information to an outside server.

As a fourth such example, a device set 102 configured as provided herein may provide a more accurate and nuanced selection of devices 104 to perform respective actions 202. Rather than configuring the devices 104 to inform a server 108 of the respective state of such devices 104, the techniques presented herein enable each device 104 to determine its current suitability for performing the action 202, based on any criteria that the device 104 is configured to evaluate, such as the hardware and/or software capabilities of the device 104; the current task load of the device 104; the physical location of the device 104, and/or the proximity of the device 104 to the user 102 and/or other devices 104; and the current and predicted future circumstances of the device 104. That is, the determination of the suitability of each device 104 for performing the action 202 is delegated to the respective devices 104, and may be handled by the respective devices 104 based on any criteria that the device 104 is configured to evaluate. Moreover, the state of the device 104 may change rapidly, and allocating the determination of suitability for a particular action 202 to the respective devices 104 enables determinations based on more up-to-date information than is achievable by information distributed to a server 108.

As a fifth such example, in some embodiments of the presented techniques, the peer-based architecture of the device set 102 enables any device 104 to request the performance of an action 202, and any other device 104 to respond with a high suitability report 210 as an offer to perform the activity 202. This architecture therefore promotes the robustness and extensibility of the device set 102, as many numbers and types of devices 104 may join or leave the device set 102 without diminishing the capability of the device set 102 to perform the requested actions 202. These and other technical effects may be achievable through the configuration of a device set 102 in accordance with the techniques presented herein.

D. Exemplary Embodiments

Figure 3:
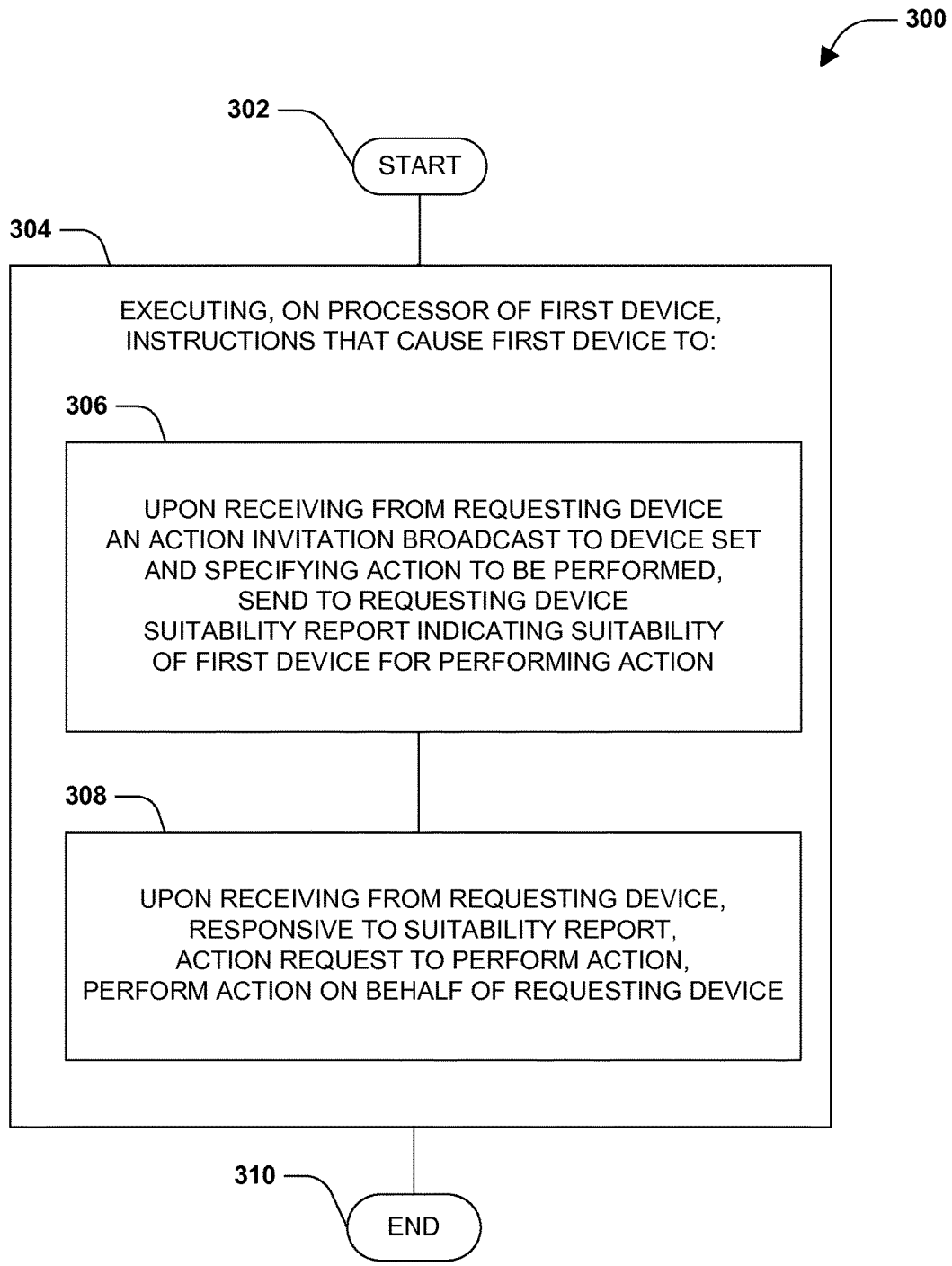
FIG. 3 is an illustration of an exemplary method for configuring a device of a device set to perform an action in accordance with the techniques presented herein.

FIG. 3 presents a first exemplary embodiment of the techniques presented herein, illustrated as an exemplary method 300 of enabling a first device 104 of a device set 102 to perform actions 202. The exemplary method 300 involves a first device 104 having a processor that is capable of executing instructions that cause the first device 104 to operate according to the techniques presented herein. The exemplary method 300 may be implemented, e.g., as a set of instructions stored in a memory component, such as a memory circuit, a platter of a hard disk drive, a solid-state storage device, or a magnetic or optical disc, and organized such that, when executed on a processor of the first device 104, cause the first device 104 to operate according to the techniques presented herein.

The exemplary method 300 begins at 302 and involves executing 304 the instructions on the processor of the first device 104. Specifically, the instructions cause the first device 104 to, upon receiving, from a requesting device, an action invitation broadcast to the device set and specifying an action 202 to be performed, send 306 to the requesting device 200 a suitability report 210 indicating a suitability of the first device 104 for performing the action 202. The instructions also cause the first device 104 to, upon receiving, from the requesting device 200 and responsive to the suitability report 210, an action request 216 to perform the action 202, perform 308 the action 202 on behalf of the requesting device 200. Having achieved the performance of the action 202 on behalf of the requesting device 200, the exemplary method 300 achieves the implementation of the techniques presented herein on the first device 104, and so ends at 310.

Figure 5:
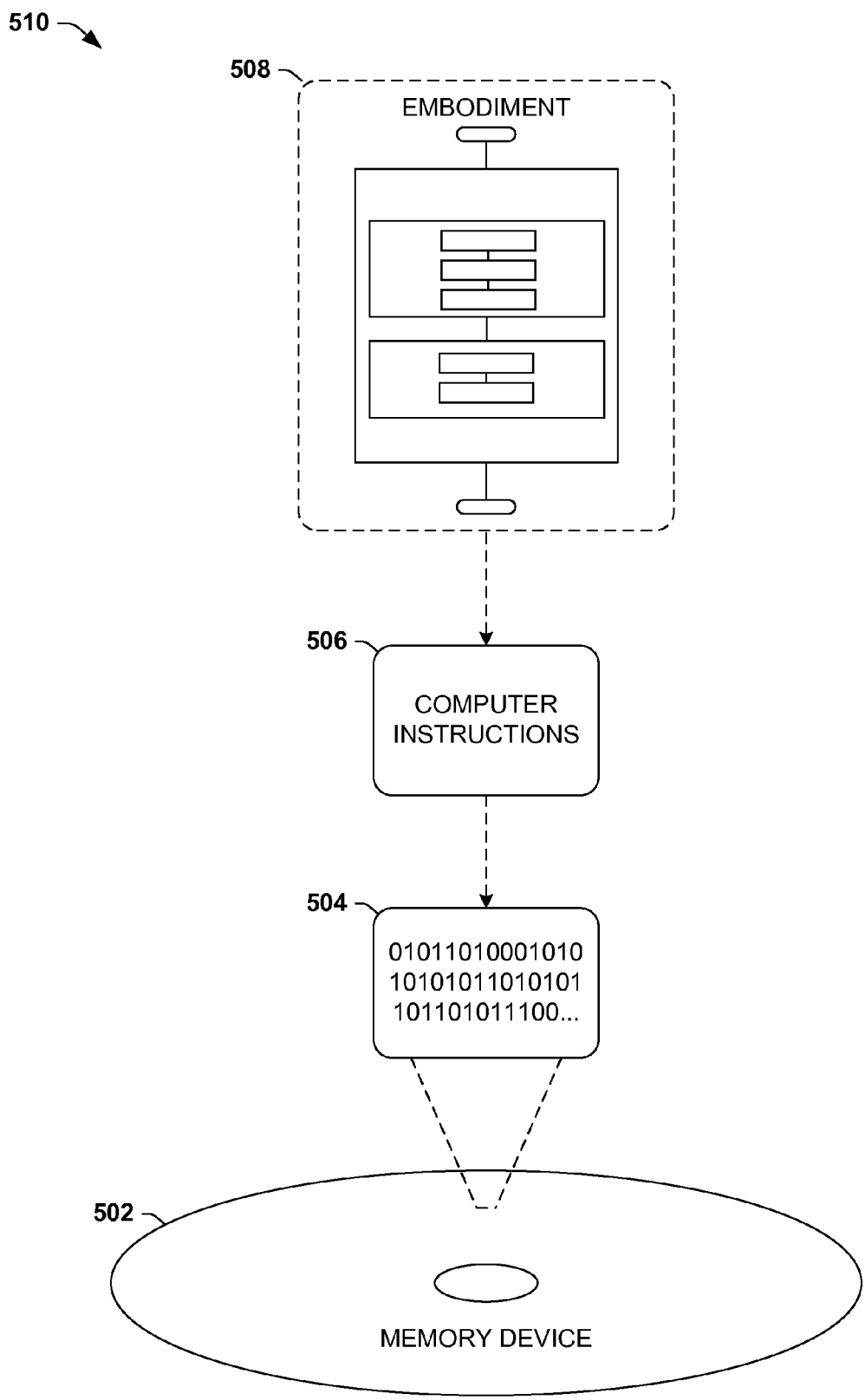
FIG. 5 is an illustration of an exemplary memory device storing processor-executable instructions configured to embody one or more of the provisions set forth herein.

FIG. 5 presents a second exemplary embodiment of the techniques presented herein, illustrated as an exemplary scenario 400 featuring an exemplary system 406 that enables a first device 402 of a device set 102 to perform actions 202 in cooperation with a second device 104 and a third device 104 of the device set 102. The exemplary system 406 may be implemented, e.g., as a set of components respectively comprising a set of instructions stored in a memory of the first device 402, where the instructions of the respective components, when executed on a processor 404 of the first device 402, cause the first device 402 to perform a portion of the techniques presented herein.

The exemplary system 406 includes an action performer 408 that, upon receiving a broadcast 206 within the device set 102 indicating an action 202 to be performed (e.g., an action invitation 204 broadcast by a requesting device 200), returns a suitability report 210 indicating a suitability of the first device 402 for performing the action 202; and upon receiving, responsive to the suitability report 210, an action request 216 for the first device 402 to perform the action 202, performs the action 202 on behalf of the requesting device 200. The exemplary system 406 also includes an action requester 410 that, upon receiving, from a local application executing on the processor 404 of the first device 402, a second request to perform a second action 202, broadcasts the second request to the device set 102 (e.g., as an action invitation 204 specifying the action 202 requested by the local application); and upon receiving, from at least two responding devices 212 of the device set 102, a suitability report 210 respectively indicating the suitability of the responding device 212 for performing the second action 202, identifies a selected device 214 among the at least two responding devices 212, and requests the selected device 214 to perform the second action 202. In this manner, the exemplary system 406 causes the device first 402 to participate in the performance of the actions 202 by the device set 102 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that exclude computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 4:
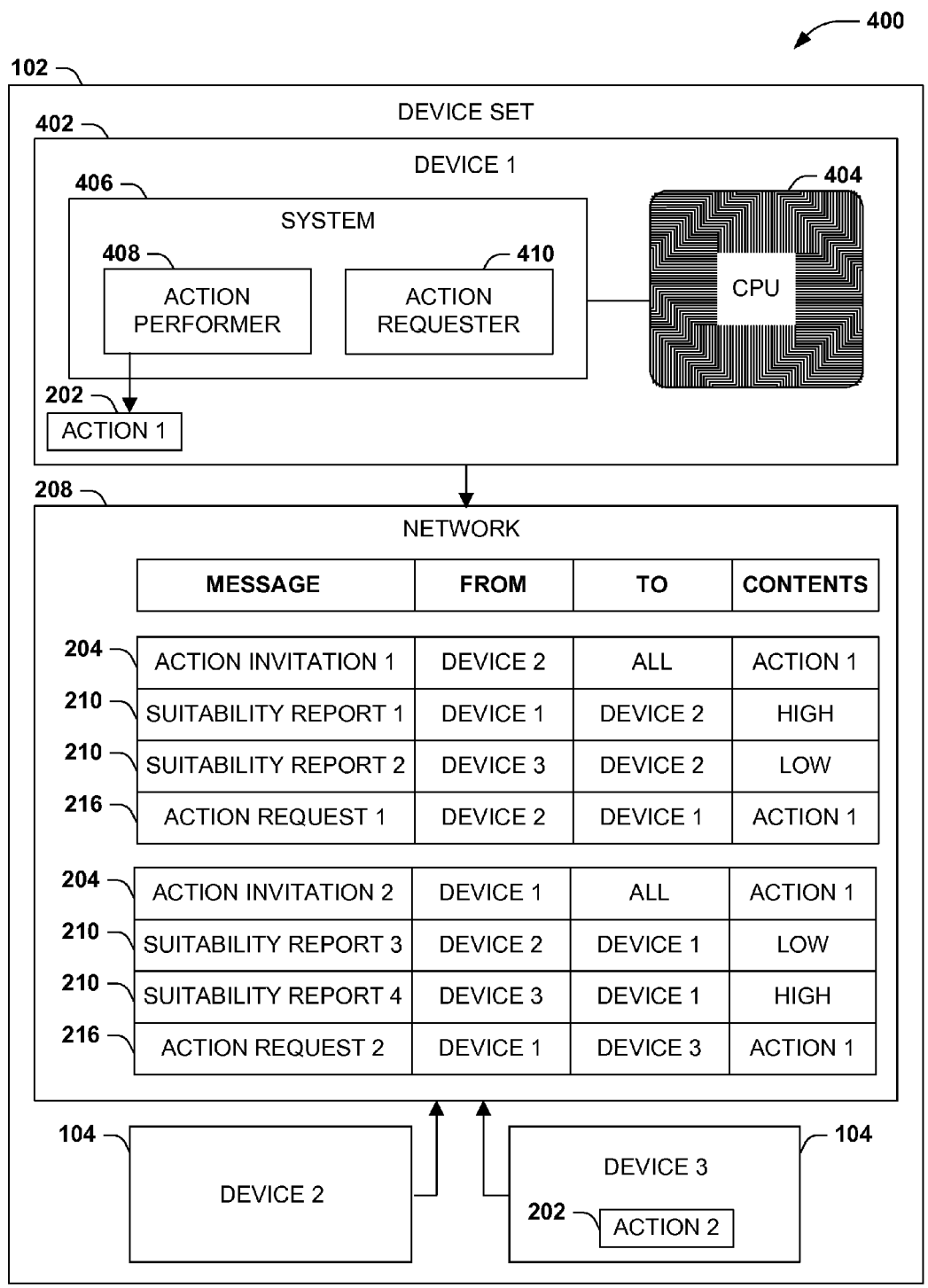
FIG. 4 is an illustration of an exemplary device including an exemplary system for interacting with a device set to perform actions in accordance with the techniques presented herein.

An exemplary computer-readable medium that may be devised in these ways is illustrated in FIG. 5, wherein the implementation 600 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 504 of a computing device 510, cause the computing device 510 to operate according to the principles set forth herein. In a first such embodiment, the processor-executable instructions 506 may be configured to perform a method of enabling a first device 104 to perform an action 202 on behalf of a device set 102, such as the exemplary method 300 of FIG. 3. In a second such embodiment, the processor-executable instructions 506 may be configured to implement a system configured to cause a first device 402 to participate in the performance of actions 202 by a device set 102, such as the exemplary system 406 of FIG. 4. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3; the exemplary system 406 of FIG. 4; and the exemplary memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 104, such as workstations, laptops, tablets, phones and other communication devices, headsets, earpieces, eyewear, wristwatches, portable gaming devices, portable media players such as televisions, and appliances.

Figure 6:
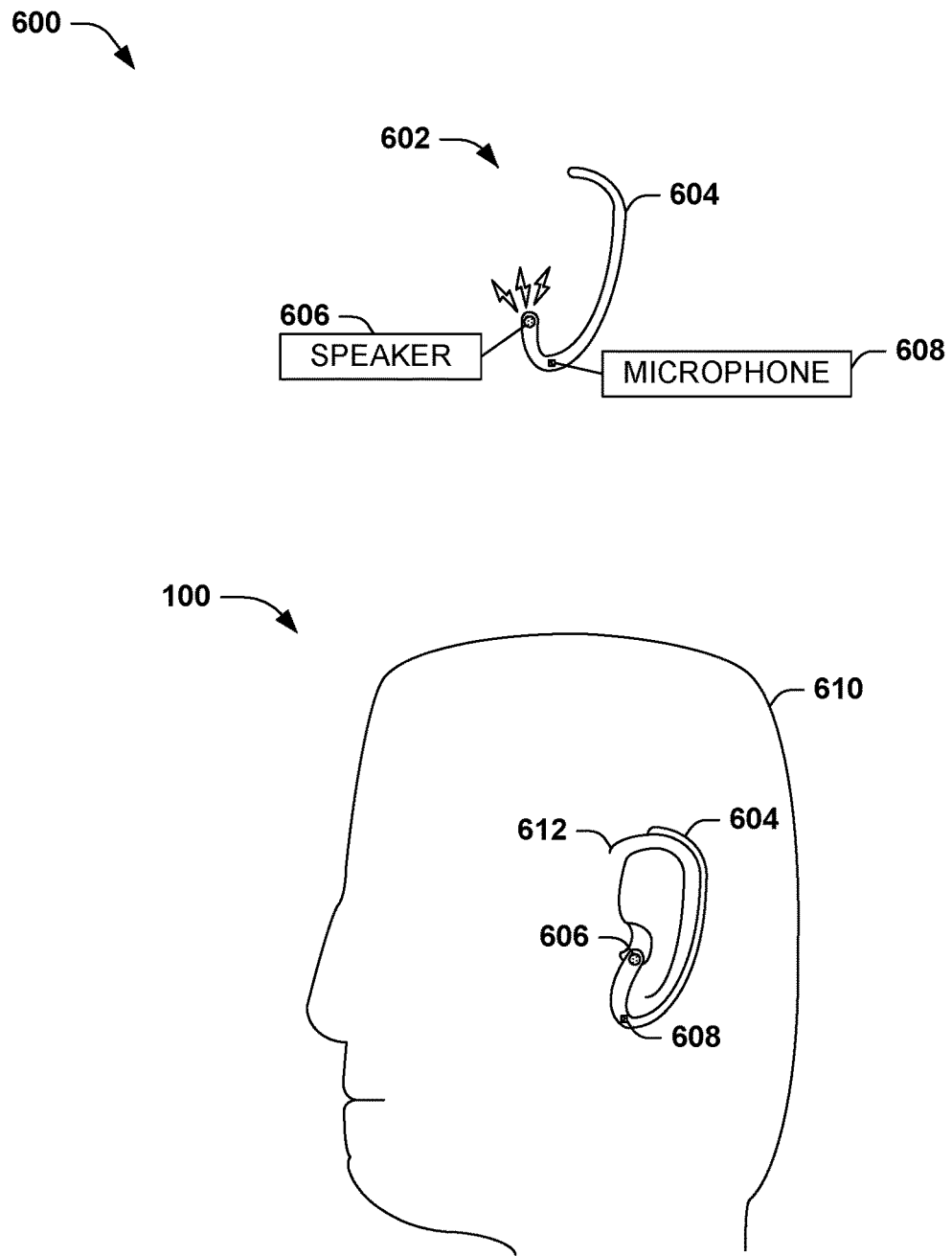
FIG. 6 is an illustration of an exemplary device in which the techniques provided herein may be utilized.

FIG. 6 presents an illustration of an exemplary scenario 600 featuring an earpiece device 602 wherein the techniques provided herein may be implemented. This earpiece device 602 may be worn by a user 100, and may include components that are usable to implement the techniques presented herein. For example, the earpiece device 602 may comprise a housing 604 wearable on the ear 612 of the head 610 of the user 100, and may include a speaker 606 positioned to project audio messages into the ear 612 of the user 100, and a microphone 608 that detects an audio sample of the environment of the user 100. In accordance with the techniques presented herein, the earpiece device 602 may participate in the performance of actions 202 on behalf of the device set 102, such as communicating with the user 100 upon receiving an incoming message or communication session; invoking another device 104 of the device set 102 in order to initiate a communication session with another individual (e.g., sending an action invitation 204 for another device 104 to transmit communication data from the user 100 to a network such as the internet); and/or to accept and process data generated by the user 100, such as storing and/or transcribing a voice memo. In this manner, an earpiece device 602 such as illustrated in the exemplary scenario 600 of FIG. 6 may participate in the techniques presented herein.

As a second variation of this first aspect, the techniques presented herein may be utilized with a variety of device sets 102, such as a set of devices 104 that are owned by a particular user 100 or institution; a set of devices 104 that are deployed to a particular area; and/or a set of devices 104 that occupy a particular role, such as a set of file servers. Moreover, the devices 104 of the device set 102 may communicate in a variety of ways, including a personal area network (PAN) such as Bluetooth; a wired and/or wireless local area network (LAN), such as WiFi or a cellular network; or a wide-area network (WAN), such as the internet or a virtual private network (VPN) deployed thereupon.

As a third variation of this first aspect, the techniques presented herein may be utilized to achieve the performance of a variety of actions 202. As a first such example, the actions 202 may comprise the receipt, generation, evaluation, storage, and/or transmission of various forms of data. As a second such example, the actions 202 may involve a particular user 100, such as a communication session intended to include the user 100, or a physical activity that the user 100 wishes to perform with the assistance of a device 104. As a third such example, the actions 202 may include a particular place or object, such as the monitoring of a weather condition in a particular area. As a fourth such example, the actions 202 may include a particular circumstance or context that may apply to one or more devices, such as devices that are currently carried by the user 100. Moreover, the action 202 may be initiated by the requesting device 200 on behalf of a local application executing on the requesting device 200, and/or on behalf of a remote device outside of the device set 104, such as a server. Those of ordinary skill in the art may devise many such scenarios in which the techniques presented herein may be utilized.

E2. Device Suitability

A second aspect that may vary among embodiments of the techniques presented herein involves the manner in which a device 104 of the device set 102 determines and reports its suitability for performing a requested action 202.

As a first variation of this second aspect, a first device 104 may determine its suitability for performing an action 202 according to an accessibility of the user 100 by the first device 104. As a first such example, the accessibility may comprise the proximity of the user 100; e.g., the action 202 may comprise an audio alert to be presented to the user 100, and the suitability may comprise a detection that the user 100 is within audible range of the first device 104. As a second such example, the action 202 may comprise capturing an image of the user 100, and the suitability may comprise a visibility of the user 100 to a camera of the first device 104. As a third such example, the action 202 may utilize the attention of the user 100, such as the ability of the user 100 to answer a particular question, and the suitability may be determined according to whether the user 100 is currently paying attention to the first device 104, and/or whether the user 100 is able to pay attention to the first device 104. The distinctiveness of these concepts may be illustrated, e.g., according to a collection of three devices 104 that are present in a vehicle of the user 100: a first device 104 that is positioned in a compartment of the vehicle, and thus is not proximate to the user 100; a second device 104 that is present near the user 100, but that the user 100 is unable to attend to safely, such as a visual device that the user 100 is unable to utilize while operating the vehicle; and a third device 104 that is both present near the user 100 and capable of utilizing the attention of the user 100, such as an audio device that may more safely communicate with the user 100.

As a second variation of this second aspect, a first device 104 may determine its suitability for performing an action 202 according to a device capability of the first device 104 to perform the action 202. As a first such example, the action 202 may comprise capturing an image of the user 100, and the suitability of the first device 104 may be determined in view of whether or not the first device 104 has a suitable camera. As a second such example, the action 202 may comprise presenting an audio message to the user 100 through an output device, and the first device 104 may identify itself as having high suitability if it comprises an audio output device, and a lower but still positive suitability if it comprises an audio transcribing component and a visual output device, in order to present the audio message as a text message.

As a third variation of this second aspect, a first device 104 may determine its suitability for performing an action 202 according to the resources availability of the first device 104, such as its available processing power, storage capacity, or network bandwidth. As a particular example, the resource availability may comprise a power capacity of the first device 104, e.g., whether the first device 104 is operating on an unlimited power source, such as a wall outlet; a limited but plentiful power source, such as a fully-charged battery; or a limited and scant power source, such as a nearly depleted battery.

As a fourth variation of this second aspect, a first device 104 may determine its suitability for performing an action 202 according to a user preference specified by a user 100.

For example, the action 202 comprises an audio message to be presented to the user 100, and even if the first device 104 comprises a speaker that is capable of presenting the audio message to the user 100; however, the user 100 may indicate his or her preference that the first device 104 is not to present audio messages. Accordingly, the first device 104 may identify itself as unsuitable for the action 202. Conversely, the user 100 may specify that a particular device 104 is to perform all actions 202 of a particular type, such as presenting text messages to the user 100, even if other devices 104 might have been automatically determined as having higher suitability.

Figure 7:
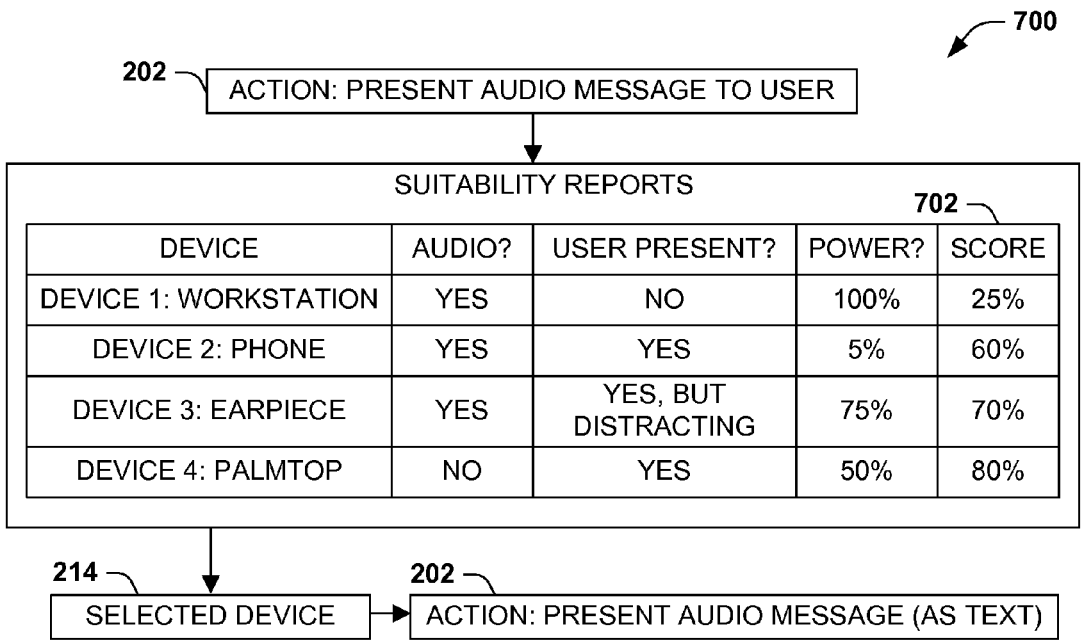
FIG. 7 is an illustration of an exemplary scenario featuring a selection of a device for performing an action in view of a set of suitability reports, in accordance with the techniques presented herein.

FIG. 7 presents an illustration of an exemplary scenario 700 wherein a combination of considerations are utilizes to determine the suitability of the devices 104 of a device set 102 for performing an action 202 comprising the presentation of an audio message to the user 100, and where the suitability of each device 104 is reported as a suitability score 702. A first device 104, such as a workstation, may determine that the user 100 is not present near the device 104, and may therefore present a comparatively low suitability score 702 of 25%. A second device 104, such as a mobile phone, may determine that it is capable of presenting audio messages and is in the presence of the user 100, but may identify that its power supply is diminished, and may therefore present a suitability score 702 of 60% in order to conserve power for higher-priority tasks. A third device 104, such as a wearable earpiece, may determine that it is near the user 100, that it features a plentiful power source, and that the earpiece device 104 includes a speaker that is positioned near the ear of the user 100, but may determine that the user 100 is currently engaged in a verbal conversation, and that an audio message may be undesirably distracting or difficult to receive without diverting the attention of the user 100. Therefore, the second device 104 may present a suitability score 702 of 70%. A fourth device 104, comprising a palmtop computer, may determine that it is near the user 100 and has a plentiful power supply, but lacks an audio component. Nevertheless, the fourth device 104 may be capable of translating the audio message into text for presentation to the user, and so the fourth device 104 may report a suitability score 702 of 80%. Because the fourth device 104 reports the highest suitability score, a requesting device 200 that initially received the audio message may transmit the audio message to the fourth device 104 for translation and presentation o the user 100 in accordance with the techniques presented herein.

As a fifth variation of this second aspect, some actions 202 may involve an interoperation of two or more devices 104 of the device set 102. For example, a first device 104 may receive a request from a user 100 to record video, and may comprise a videocamera that is capable of capturing the video, but may not have adequate storage. The first device 104 may request a second device 104 to participate in the recording of the video by storing a video stream captured by the first device 104. When a second device 104 indicates a high suitability for storing the video (such as plentiful storage capacity), the first device 104 and the second device 104 may cooperatively perform the action 202; e.g., the first device 104 may capture the stream and transmit it to the second device 104, which receives the stream and stores the video. Alternatively, if the first device 104 that receives the request from the user 100 also does not include a camera, it may request the devices 104 of the device set 102 to indicate a suitability for capturing video, and when a third device 104 reports a high suitability for capturing video, the second device 104 and the third device 104 may cooperatively achieve the recording of the video.

Figure 8:
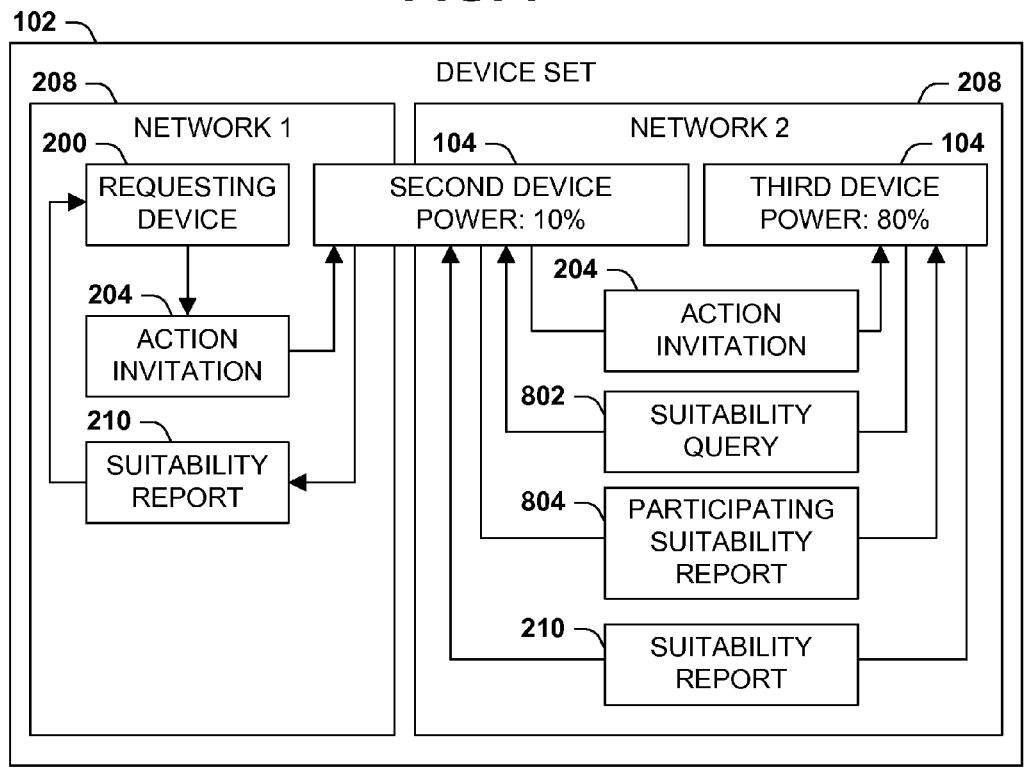
FIG. 8 is an illustration of an exemplary scenario featuring a selection of a device for performing an action involving a participation of a second device, in accordance with the techniques presented herein.

FIG. 8 presents an illustration of a sixth variation of this second aspect, wherein a requesting device 200 receives, from a local application and/or a user, a request to perform an action 202 that involves network communication (e.g., playing for the user 100 an audio stream received over the internet). A third device 104 may individually represent a high suitability for the action 202, including plentiful power capacity. However, the requesting device 200 may be in communication with the second device 104 over a first network 208 (e.g., a wide-area network, such as the internet), and the second device 104 may be in communication with the third device 104 over a second network 208 (e.g., a personal-area network, such as a Bluetooth network), but the third device 104 may not be connected to the first network 208. Accordingly, the action invitation 204 sent by the requesting device 200 may be transmitted over the first network 208 to the second device 104, and the second device 104 may retransmit the action invitation 204 to the third device 104 over the second network 208, in order to ensure that all available devices 104 of the device set 102 receive and respond to the action invitation 204. Additionally, the third device 104 may determine that performing the action 202 involves a participation by the second device 104; e.g., the third device 104 may receive the audio stream through the second device 104 as a tether to the first network 102 over which the audio stream is broadcast. Accordingly, the third device 104 may evaluate its suitability to perform the action 202 in further view of the suitability of the second device 104. For example, the third device 104 may send to the second device 104 a suitability query 802, querying the second device 104 as to the suitability of the second device 104 to participate in the action 202 performed by the third device 104. The second device 104 may respond by transmitting a participating suitability report 804 to the third device 104 indicating a low suitability (e.g., a scant power source). The third device 104 may therefore report a low suitability for performing the action 202, as the streaming of the audio stream through the second device 104 may result in a depletion of its scant power source.

As a sixth variation of the techniques presented herein, a device 104 of the device set 102 may determine its suitability for performing an action 202 in view of a future suitability of the first device at a future time. As a first such example, a first device 102 may determine that it currently has a limited but plentiful power reserves, but may determine that the user 100 intends to take the device 102 on a train trip, when the user 100 may expect to use the first device 104 and may depend upon its plentiful power supply at that time. Accordingly, the first device 104 may report a low suitability for performing an action 202 at a present time even if its power source is plentiful, due to the anticipated future prioritization of power capacity at a future time. As a second such example, a first device 102 may determine that it is currently unsuitable for performing an action 202, but may anticipate that a future time presents a high suitability for performing the action 202; e.g., the device 104 may be requested to present a message to a user 100 who is currently inaccessible to the device 104, but who is anticipated to be in the proximity of the device 104 in the near future. The device 104 may therefore report a high suitability for performing the action 202 (either presently, or as an indication that the current suitability is low but an anticipated future suitability is high, which may enable a selection of the device 104 unless another device that is currently in the presence of the user 100 presents a currently high suitability). Many such considerations, including a combination thereof, may be utilized to determine and report the suitability of the devices 104 for performing an action 202 on behalf of the device set 102 in accordance with the techniques presented herein.

E3. Performing Actions on Suitable Devices

A third aspect that may vary among embodiments of the techniques presented herein involves the manner of performing the action in view of the suitability reports 210 of the respective devices 104 of the device set 102.

As a first variation of this third aspect, the requesting device 200 may identify the device 104 reporting the highest suitability for the action 202 among the responding devices 212 of the device set 102, and may send an action request 216 asking the selected device 104 to perform the action 202. Alternatively, the requesting device 200 may select, among the responding devices 212 of the device set 104, a subset of the devices 104 of the device set 102 based on their reported suitabilities, and may send action requests 216 to each selected device 214 of the selected device subset. As a further example, where the action 202 is associated with an action priority, the requesting device 200 may identify, among the responding devices 212, a responding device subset having a subset size that is proportional to the action priority of the action 202 (e.g., a large subset of devices for high-priority actions 202) in order to ensure that the action 202 is performed to completion.

Figure 9:
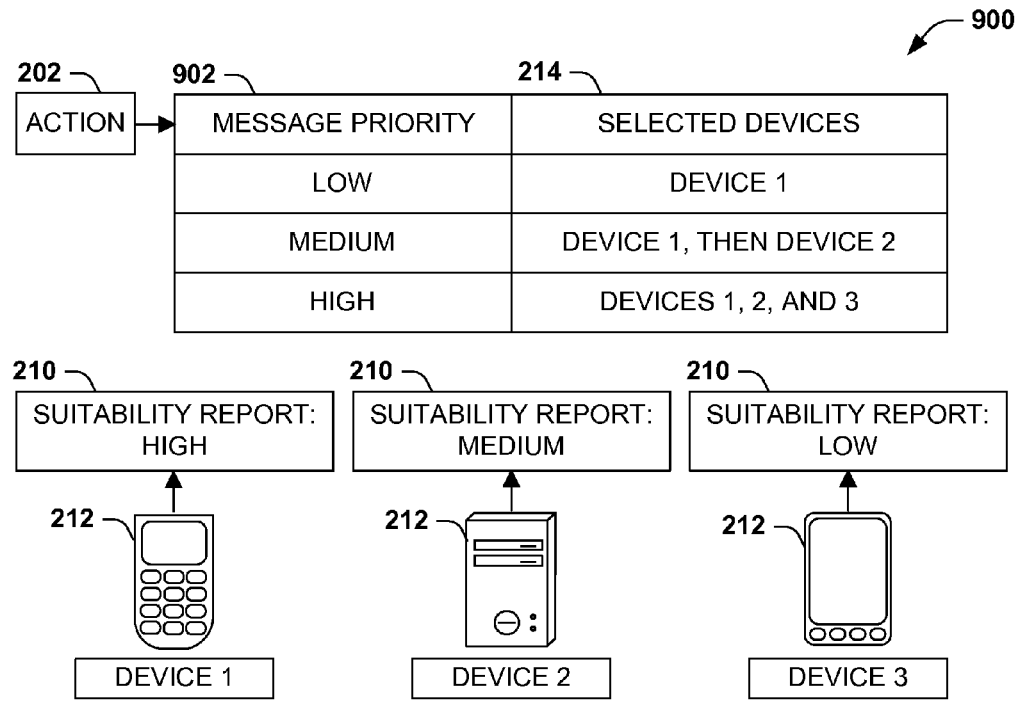
FIG. 9 is an illustration of an exemplary scenario featuring another selection of devices for performing an action in view of a set of suitability reports, in accordance with the techniques presented herein.

FIG. 9 presents an illustration of an exemplary scenario 900 featuring this first variation of this third aspect. In this exemplary scenario 900, the action 200 comprises a presentation of a message to the user 100, and the responding devices 212 of the device set 102 may respond with suitability reports 210 indicating the suitability of the respective devices 104 to present the message. However, depending upon a message priority 902 of the message, the requesting device 200 may differently identify the selected devices 214 to present the message. If the message priority 902 is low, the requesting device 200 may select the single responding device 212 reporting the highest suitability for performing the action 202. However, if the message priority 902 is medium, the requesting device 102 may first select a first device 104 having the highest reported suitability, and if the first device 104 is unsuccessful in presenting the message to the user 100, then the requesting device 200 may select a second device 104 reporting a medium suitability to retry the action 202. If the message priority 902 is high, such as an emergency message, the requesting device 200 may select all of the responding devices 212, and may send an action request 216 to all responding devices 212 in order to ensure rapid delivery of the high-priority message. In this manner, the requesting device 200 may identify the selected devices 214 to perform the action 202 in view of the message priority 902 of the message.

As a second variation of this third aspect, the selected device 214 may notify the requesting device 200 upon achieving a completion of the action 202. Alternatively or additionally, upon achieving a failure to achieve a completion of the action at a first time, the selected device 214 may notify the requesting device 200 of the failure, and/or may retry the action at a second time on behalf of the requesting device 202. Upon receiving the notification of failure (and/or upon failing to receive a report of a completion of the action 202 within a particular time frame, which may arise if the selected device 214 is disabled or experiences a loss of power or connectivity), the requesting device 200 may therefore select a second device 104 of the device set 102 to perform the action 202. Similarly, if the requesting device 200 is requesting a performance of the action 202 by the device set 102 on behalf of a local application and/or a remote device outside of the device set 102, the requesting device 202 may transmit notifications of a completion and/or a failure of the performance of the action 202 by the selected device 214.

Figure 10:
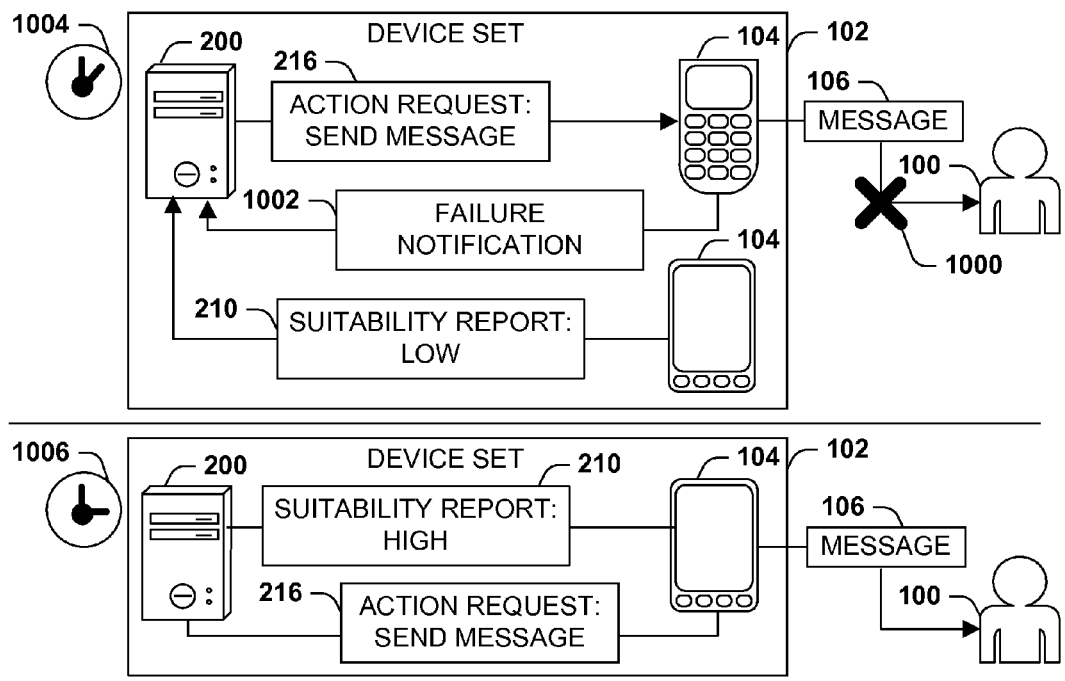
FIG. 10 is an illustration of an exemplary scenario featuring a third selection of devices for performing an action in view of a set of suitability reports, in accordance with the techniques presented herein.

FIG. 10 presents an illustration of an exemplary scenario 1000 featuring the completion of an action involving the transmission of a message 106 to a user 100 by a device set 102. In this exemplary scenario 1000, at a first time 1004, a requesting device 200 (such as a workstation) receives the message 106 to be presented to the user 100, but detects that the user 100 is not present near the requesting device 200. The requesting device 200 therefore sends to the device set 102 an action invitation, and a first device 104, such as a mobile phone that is currently carried by the user 100, reports a high suitability, while a second device 104, such as a tablet that is not near the user 100, reports a low suitability. The requesting device 200 therefore sends an action request 216 to the first device 104 requesting a presentation of the message 106. However, the user 100 may not be paying attention to the first device 104 (e.g., the first device 104 may be in the user's pocket and may not be detected, or the user 100 may have walked away from the first device). The first device 104 may therefore detect a failure 1000 of the user 100 to receive the message 106 (such as a detected absence of the user 100 or a lack of acknowledgment by the user 1000), and may send a failure notification 1002 to the requesting device 200. At a second time 1006, after receiving the failure notification 1002, the requesting device 200 may send another action invitation 204 for the same action 202 in order to identify a second selected device 214 to perform the action 202. At the second time 1006 the second device 104 that previously reported a low suitability may now report a high suitability, e.g., because the user 100 is now actively using the second device 104. The requesting device 200 may therefore send a second action request 216 for the message 106 to the second device 104, which may successfully present the message 106 to the user 100, and may therefore send a completion report to the requesting device 200. In this manner, the devices 104 of the device set 102 may interoperate to achieve the completion of the action 202 on behalf of the requesting device 200 in accordance with the techniques presented herein.

E. Computing Environment

Figure 11:
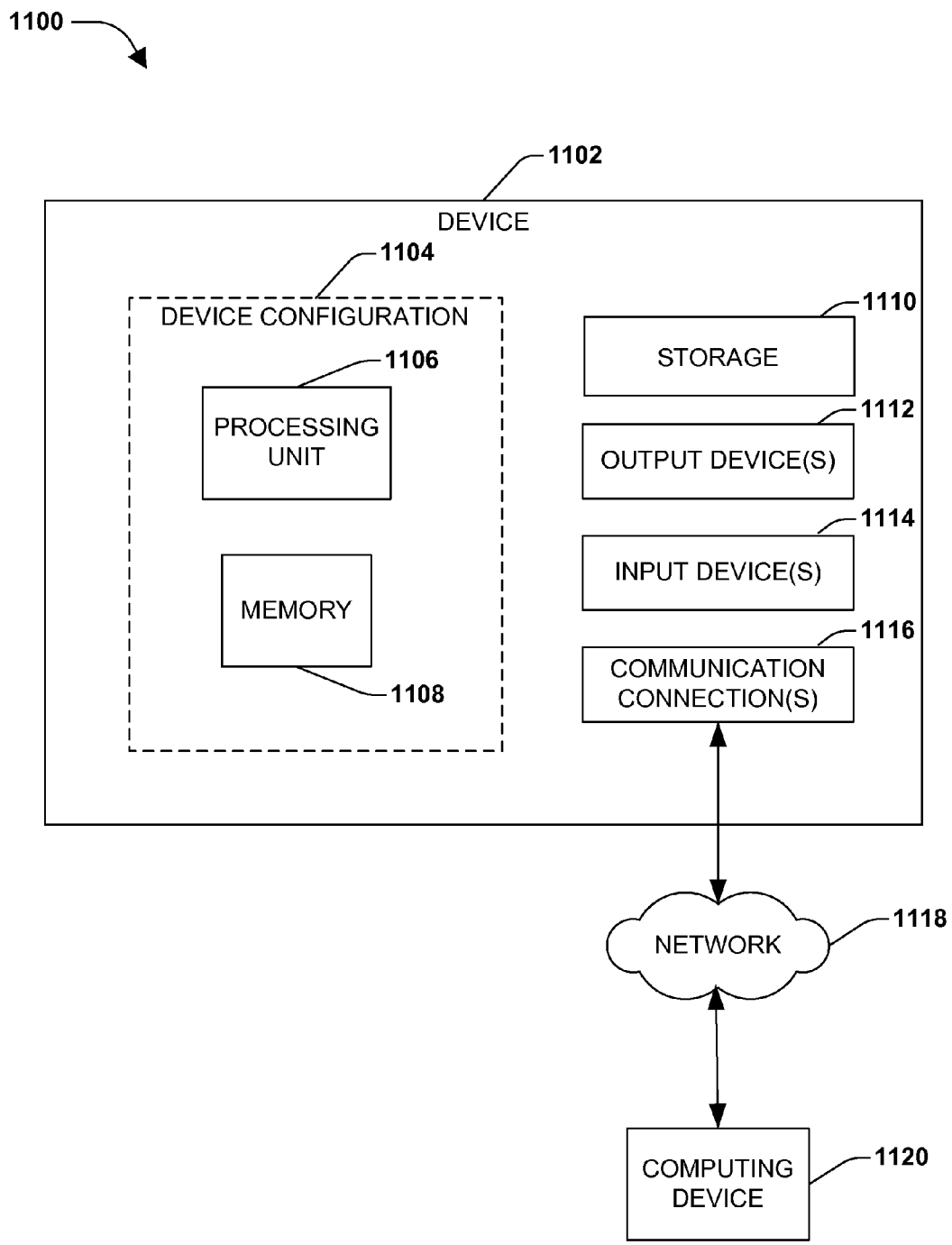
FIG. 11 is an illustration of an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer-readable storage devices. Such computer-readable storage devices may be volatile and/or non-volatile, removable and/or non-removable, and may involve various types of physical devices storing computer readable instructions or other data. Memory 1108 and storage 1110 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection, or other interfaces for connecting computing device 1102 to other computing devices. Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1114 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one embodiment, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1120 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of causing a first device of a device set of a user to perform actions, the method comprising:
    executing on a processor of the first device instructions that cause the first device to:
        receive, from a requesting device, a first action invitation broadcast to each device in the device set of the user and specifying a first action to be performed;
        send to the requesting device a suitability report indicating a suitability of the first device for performing the first action, wherein the suitability of the first device is based, at least, on a device capability of the first device to perform the first action;
        upon receiving, from the requesting device and responsive to the suitability report, a first action request to perform the first action, perform the first action on behalf of the requesting device;
        upon receiving a request to perform a second action from a local application, broadcast, to the device set, a second action invitation specifying the second action;
        receive from a plurality of responding devices a plurality of suitability reports indicating the suitability of the responding device to perform the second action;
        evaluate the plurality of suitability reports of the responding devices to identify a selected device to perform the second action; and
        send to the selected device a second action request to perform the second action on behalf of the first device.

2. The method of claim 1, wherein:
    the first action involves a user of the device set; and
    the instructions further cause the first device to identify the suitability of the first device for performing the first action according to an accessibility of the user by the first device.

3. The method of claim 1, wherein the instructions further cause the first device to identify the suitability of the first device for performing the first action according to a power capacity of the first device.

4. The method of claim 1, wherein:
    the first action performed by the first device further involves a participation by a second device;
    the instructions further cause the first device to identify the suitability of the first device and the second device for performing the first action; and
    performing the action further comprises: performing the first action with the participation of the second device on behalf of the requesting device.

5. The method of claim 4, wherein identifying the suitability of the second device for performing the action further comprises:
    querying the second device for the suitability of the participation of the second device in the first action; and
    receiving, from the second device, a participating suitability report of the suitability of the participation of the second device in the first action.

6. The method of claim 1, wherein the instructions further cause the first device to:
    identify the suitability of the first device for performing the first action according to a future suitability of the first device at a future time; and
    upon receiving the action request to perform the first action:
        store the request until the future time; and
        at the future time, perform the first action on behalf of the requesting device.

7. The method of claim 1, wherein the instructions further cause the first device to identify the suitability of the first device for performing the first action specified by a user preference of a user of the device set.

8. A system causing a first device having a processor and included in a device set of a user to perform actions, the system comprising:
    an action performer that:
        upon receiving a broadcast within each device of the device set of the user indicating a first action to be performed, returns a first suitability report indicating a suitability of the first device for performing the first action, wherein the suitability of the first device is based, at least, on a device capability of the first device to perform the first action; and upon receiving, responsive to the first suitability report, an action request for the first device to perform the first action, performs the first action; and an action requester that, upon receiving, from a local application, a second request to perform a second action:
broadcasts the second request to each device of the device set of the user; and
upon receiving, from at least two responding devices of the device set, a second suitability report respectively indicating the suitability of the responding device for performing the second action:
among the at least two responding devices, identifies a selected device; and
requests the selected device to perform the second action.

9. The system of claim 8, wherein:
the first suitability report comprises a suitability score indicating the suitability of the first device for performing the first action; and
identifying the selected device further comprises: identifying the responding device specifying a highest suitability score among the respective suitability reports of the at least two responding devices.

10. The system of claim 8, wherein:
identifying the selected device further comprises: identifying, among the at least two responding devices, a responding device subset for performing the second action; and
requesting the selected device to perform the second action further comprises: for the respective responding devices of the responding device subset, request the respective responding second device to perform the second action.

11. A memory device storing instructions that, when executed on a processor of a first device of a device set of a user, causes the first device to perform actions on behalf of the device set, by:
receiving, from a requesting device, a first action invitation broadcast to each device of the device set of the user and specifying a first action to be performed;
sending to the requesting device a first suitability report indicating a suitability of the first device for performing the first action, wherein the suitability is based, at least, on a device capability of the first device to perform the first action;
upon receiving, from the requesting device and responsive to the first suitability report, a first action request to perform the first action, performing the first action on behalf of the requesting device;
upon receiving, from a local application, a request to perform a second action, broadcasting to the device set a second action invitation specifying the second action;
receiving from a plurality of responding devices a plurality of suitability reports indicating the suitability of the responding device to perform the second action;
evaluating the plurality of suitability reports of the responding devices to identify a selected device to perform the second action; and
sending to the selected device a second action request to perform the second action on behalf of the first device.

12. The memory device of claim 11, wherein:
the first action is performed by the first device and the requesting device; and
performing the first action further comprises: performing the first action with the requesting device.

13. The memory device of claim 11, wherein the actions further comprise, upon achieving a completion of the first action, notifying the requesting device of the completion of the first action.

14. The memory device of claim 11, wherein the actions further comprise, upon failing to achieve a completion of the first action at a first time:
storing the first action request until a second time; and
at the second time, retrying the first action on behalf of the requesting device.

15. The memory device of claim 11, wherein the actions further comprise, upon detecting a failure to complete the first action, notifying the requesting device of the failure to complete the first action.

16. The memory device of claim 11, wherein the actions further comprise, upon receiving, from the selected device, a notification of a failure to complete the second action:
identifying a second selected device for performing the second action; and
sending the second action request to the second selected device.

17. A method of causing a first device of a device set of a user to perform actions, the method comprising:
receiving, from a requesting device, an action invitation broadcast to each device in the device set of the user and specifying an action to be performed, wherein the action involves a participation by a second device;
identifying the suitability of the first device and the second device for performing the action based on, at least, capabilities of the first device and the second device;
in response to said receiving the action invitation, sending to the requesting device a suitability report indicating the suitability of the first device and the second device for performing the action; and
upon receiving, from the requesting device and responsive to the suitability report, an action request to perform the action, performing the action with the participation of the second device on behalf of the requesting device.

18. The method of claim 17, wherein:
receiving, from a local application, a request to perform a second action:
broadcasting, to the device set, a second action invitation specifying the second action;
upon receiving, from at least one responding device of the device set, a suitability report indicating the suitability of the responding device to perform the second action:
evaluating the respective suitability reports of the respective responding devices to identify a selected device; and
sending to the selected device a second action request to perform the action on behalf of the first device.

19. The method of claim 17, wherein:
the action involves a user of the device set; and
the instructions further cause the first device to identify the suitability of the first device for performing the action according to an accessibility of the user by the first device.

20. The method of claim 17, wherein the instructions further cause the first device to identify the suitability of the first device for performing the action according to a power capacity of the first device.

21. The method of claim 17, wherein identifying the suitability of the second device for performing the action further comprises:

querying the second device for the suitability of the participation of the second device in the action; and receiving, from the second device, a participating suitability report of the suitability of the participation of the second device in the action.

22. The method of claim 17, wherein the instructions further cause the first device to:
identify the suitability of the first device for performing the action according to a future suitability of the first device at a future time; and
upon receiving the action request to perform the action:
store the request until the future time; and
at the future time, perform the action on behalf of the requesting device.

23. The method of claim 17, wherein the action is displaying a message notification.

24. The method of claim 1, wherein the first action is displaying a message notification.

25. The method of claim 8, wherein the first action is displaying a message notification.

26. The method of claim 11, wherein the first action is displaying a message notification.

\* \* \* \* \*